US010067818B2

(12) United States Patent
He et al.

(10) Patent No.: US 10,067,818 B2
(45) Date of Patent: *Sep. 4, 2018

(54) RECOVERY MECHANISMS ACROSS STORAGE NODES THAT REDUCE THE IMPACT ON HOST INPUT AND OUTPUT OPERATIONS

(71) Applicant: INTERNATIONAL BUSINESS MACHINES CORPORATION, Armonk, NY (US)

(72) Inventors: Wang Ping He, Shanghai (CN); Larry Juarez, Tucson, AZ (US); Matthew J. Kalos, Tuscson, AZ (US); John N. McCauley, Tucson, AZ (US); Louis A. Rasor, Tucson, AZ (US); Brian A. Rinaldi, Tucson, AZ (US); Todd C. Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/224,361

(22) Filed: Jul. 29, 2016

(65) Prior Publication Data
US 2016/0335153 A1    Nov. 17, 2016

Related U.S. Application Data

(63) Continuation of application No. 14/289,197, filed on May 28, 2014, now Pat. No. 9,459,974.

(51) Int. Cl.
*G06F 11/07*    (2006.01)
*G06F 11/20*    (2006.01)

(52) U.S. Cl.
CPC ........ *G06F 11/0793* (2013.01); *G06F 11/079* (2013.01); *G06F 11/0727* (2013.01); *G06F 11/0745* (2013.01); *G06F 11/0751* (2013.01); *G06F 11/2017* (2013.01); *G06F 11/2094* (2013.01)

(58) Field of Classification Search
CPC .................................................. G06F 11/0793
USPC ......................................................... 714/6.2
See application file for complete search history.

(56) References Cited

U.S. PATENT DOCUMENTS

| 7,152,178 | B1 | 12/2006 | Vook et al. |
| 7,555,673 | B1 | 6/2009 | Kelkar et al. |
| 8,381,027 | B1 | 2/2013 | Liu et al. |
| 8,711,684 | B1 * | 4/2014 | Usgaonkar .......... H04L 43/0811 370/216 |

(Continued)

OTHER PUBLICATIONS

U.S. Appl. No. 14/289,19,7 filed May 28, 2014.

(Continued)

*Primary Examiner* — Chae M Ko
(74) *Attorney, Agent, or Firm* — Rabindranath Dutta; Konrad Raynes Davda & Victor LLP

(57) ABSTRACT

Provided are a method, a system, and a computer program product in which a storage controller determines one or more resources that are impacted by an error. A cleanup of tasks associated with the one or more resources that are impacted by the error is performed, to recover from the error, wherein host input/output (I/O) operations continue to be processed, and wherein tasks associated with other resources continue to execute.

12 Claims, 9 Drawing Sheets

(56) References Cited

U.S. PATENT DOCUMENTS

| | | | |
|---|---|---|---|
| 9,384,086 B1 * | 7/2016 | Craddock | G06F 13/00 |
| 9,792,167 B1 * | 10/2017 | Becht | G06F 11/0745 |
| 2002/0091574 A1 | 7/2002 | Lefebvre et al. | |
| 2010/0057989 A1 | 3/2010 | Sakashita et al. | |
| 2010/0275066 A1 | 10/2010 | Mazina et al. | |
| 2011/0191639 A1 | 8/2011 | Shinohara et al. | |
| 2012/0079317 A1 | 3/2012 | Nelogal et al. | |
| 2012/0192006 A1 | 7/2012 | Qi et al. | |
| 2013/0080822 A1 | 3/2013 | Compton et al. | |
| 2013/0086413 A1 | 4/2013 | Kaliannan et al. | |
| 2013/0132766 A1 | 5/2013 | Bhatia et al. | |
| 2013/0283088 A1 | 10/2013 | Behrendt et al. | |
| 2015/0347251 A1 | 12/2015 | He et al. | |

OTHER PUBLICATIONS

Office Action dated Feb. 9, 2016, pp. 11, for U.S. Appl. No. 14/289,197, filed May 28, 2014.
Response dated May 9, 2016, pp. 9, to Office Action dated Feb. 9, 2016, pp. 11, for U.S. Appl. No. 14/289,197, filed May 28, 2014.
Notice of Allowance dated Jun. 16, 2016, pp. 8, for U.S. Appl. No. 14/289,197, filed May 28, 2014.
List of IBM Patents or Patent Applications Treated as Related, dated Jul. 29, 2016.

\* cited by examiner

RECOVERY MECHANISMS ACROSS STORAGE NODES THAT REDUCE THE IMPACT ON HOST INPUT AND OUTPUT OPERATIONS

CROSS-REFERENCE TO RELATED APPLICATIONS

This application is a continuation of Aapplication Ser. No. 14/289,197 filed on May 28, 2014, which is incorporated herein by reference in its entirety.

BACKGROUND

1. Field

Embodiments relate to recovery mechanisms across storage nodes that reduce the impact on host input and output operations.

2. Background

In certain storage system environments, a storage controller (or a storage controller complex) may comprise a plurality of storage servers that are coupled to each other, where one or more of the storage servers may comprise a plurality of processing nodes. The storage controller allows host computing systems to perform input/output (I/O) operations with storage devices controlled by the storage controller.

In many situations the storage system may have hardware or software problems that may need to be resolved. Certain mechanisms for recovery to help resolve software and hardware problems are considered aggressive because they may disrupt input/output (I/O) for several seconds or more. These recovery methods may affect a customer's service which in turn may impact their business. In one such recovery mechanism all I/O is suspended, all software threads are suspended, and all software and some hardware components within the storage system are reset. As continuous availability has become more and more important to enterprise level storage systems, several seconds of I/O impact is no longer acceptable to many clients.

SUMMARY OF THE PREFERRED EMBODIMENTS

Provided are a method, a system, and a computer program product in which a storage controller determines one or more resources that are impacted by an error. A cleanup of tasks associated with the one or more resources that are impacted by the error is performed, to recover from the error, wherein host input/output (I/O) operations continue to be processed, and wherein tasks associated with other resources continue to execute.

In certain embodiments, no communication is made to tasks associated with the other resources to indicate that the cleanup is being performed, and no communication is made to a host that has initiated the host I/O operations to indicate that the cleanup is being performed.

In further embodiments, the cleanup of the tasks associated with the one or more resources that are impacted by the error is performed asynchronously.

In additional embodiments, a determination is made as to whether the impacted resource is in an I/O path. In response to determining that the impacted resource is in the I/O path, a determination is made as to whether the impacted resource is currently executing I/O. In response to determining that the impacted resource is currently executing I/O, an I/O recovery sequence is performed. In response to determining that the impacted resource is currently not executing I/O, a determination is made as to whether operations are being performed in a non I/O recovery sequence for the impacted resource.

In further embodiments, in response to determining that operations are not being performed in the non I/O recovery sequence for the impacted resource, another non I/O recovery sequence is started. In response to determining that operations are being performed in the non I/O recovery sequence for the impacted resource, a determination is made as to whether the non I/O recovery sequence has reached a point where a new task has been started for the impacted resource. In response to determining that the new task has not been started for the impacted resource, execution of the non I/O recovery sequence is continued.

In additional embodiments, in response to determining that the new task has been started for the impacted resource, another non I/O recovery sequence is started.

In yet additional embodiments, in response to determining that the impacted resource is not in the I/O path, a determination is made as to whether operations are being performed in a non I/O recovery sequence for the impacted resource.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain error recovery sequences do not consider whether I/O paths are affected by an error, and tasks associated with I/O are cleaned up regardless of whether or not the tasks associated with the I/O are affected by the error. Certain embodiments provide mechanisms that consider whether I/O paths are affected by the error, and provide mechanisms to recover resources within the storage system with little or no impact to host I/O operations.

Certain embodiments provide a "quick recovery" mechanism to help reduce the impact to a host system. For this, a process considers I/O processing to be critical and minimizes its stoppage. All current processes on the system which are in use are stopped momentarily.

In certain embodiments a determination is made as to which resources are impacted, and only the impacted resources undergo the recovery sequence. Resources may be physical resources such as hardware devices or they may be virtual resources such as a code objects or code components.

If a resource that caused error is not in an I/O path there is no need to perform error recovery sequence to recover the I/O path. If the resource that caused error is in the I/O path but it is not currently running I/O (i.e., not in available state) then an error recovery sequence that does not recover the I/O path is performed. Tasks associated with other resources (i.e., resources not impacted) only get paused for data collection, and then continue.

In certain embodiments, although impacted resource(s) may stay offline for 30 seconds or more as they complete the recovery sequence, all tasks (including tasks associated with I/O) are only paused for a fraction of that time (in certain embodiments approximately 100 ms or less). This is important because if the pause is for an extended period of time, other resources may start being affected by errors. The host is unaware that the I/O was paused, and to the host it just appears as if the I/O took a little bit longer to complete.

Exemplary Embodiments

Figure 1:
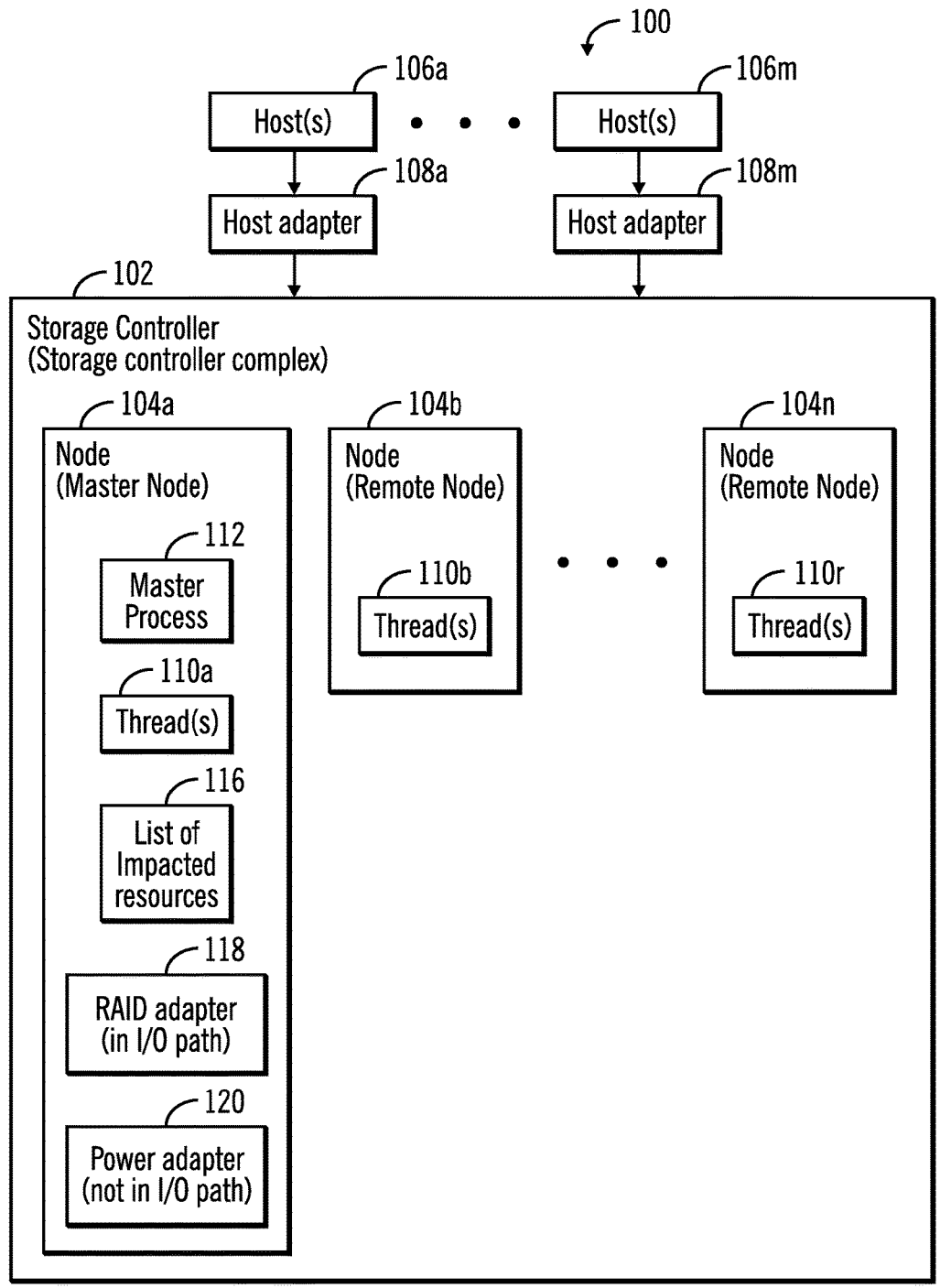
FIG. 1 illustrates a block diagram of a computing environment comprising a storage controller comprising a plurality of nodes, where the storage controller allows host computational devices to perform input/output (I/O) operations with storage devices controlled by the storage controller, in accordance with certain embodiments.

FIG. 1 illustrates a block diagram of a computing environment 100 comprising a storage controller 102 that comprises a plurality of nodes 104a, 104b, . . . 104n, where the storage controller 102 allows a plurality of host computational devices 106a . . . 106m to perform input/output (I/O) operations with storage devices controlled by the storage controller, in accordance with certain embodiments. The storage controller 102 that is comprised of the plurality of nodes 104a . . . 104n may also be referred to as a storage controller complex or a central electronic complex (CEC) or a processor complex. The storage controller 102 may comprise a set of hardware that includes central processing units (CPU), memory, channels, controllers, storage devices, power supplies, etc.

The nodes 104a . . . 104n of the storage controller 102, and the hosts 106a . . . 106m may comprise any suitable computational device including those presently known in the art, such as, a personal computer, a workstation, a server, a mainframe, a hand held computer, a palm top computer, a telephony device, a network appliance, a blade computer, a processing device, etc. The nodes 104a . . . 104n of the storage controller 102, and the hosts 106a . . . 106m may be elements in any suitable network, such as, a storage area network, a wide area network, the Internet, an intranet. In certain embodiments, the nodes 104a . . . 104n of the storage controller 102, and the hosts 106a . . . 106m may be elements in a cloud computing environment.

The hosts 106a . . . 106m may be coupled to the storage controller 102 via host adapters 108a . . . 108m. Each node 104a . . . 104n of the storage controller 102 may execute one or more threads 110a, 110b, . . . ,110r. A master process 112 may also execute within node 104a, where node 104a may be referred to as a master node. The other nodes 104b . . . 104n may be referred to as remote nodes and execute other processes.

The master node 104a may maintain a list of impacted resources 116, where the list of impacted resources 116 maintain the identity of resources such as adapters, software objects, etc., that are impacted because of an error. Resources may be physical resources such as hardware devices or may be virtual resources such as a code objects or code components.

An exemplary Redundant Array of Independent Disks (RAID) adapter 118 and a power adapter 120 have been shown in node 104a. The RAID adapter 118 allows I/O communications between node 104a and RAID devices. The power adapter 120 is for providing power to node 104a. In many situations, the RAID adapter 118 and one or more of the host adapters 108a . . . 108m may be in an I/O path whereas the power adapter 120 is not in an I/O path from a host to a RAID device.

Figure 2:
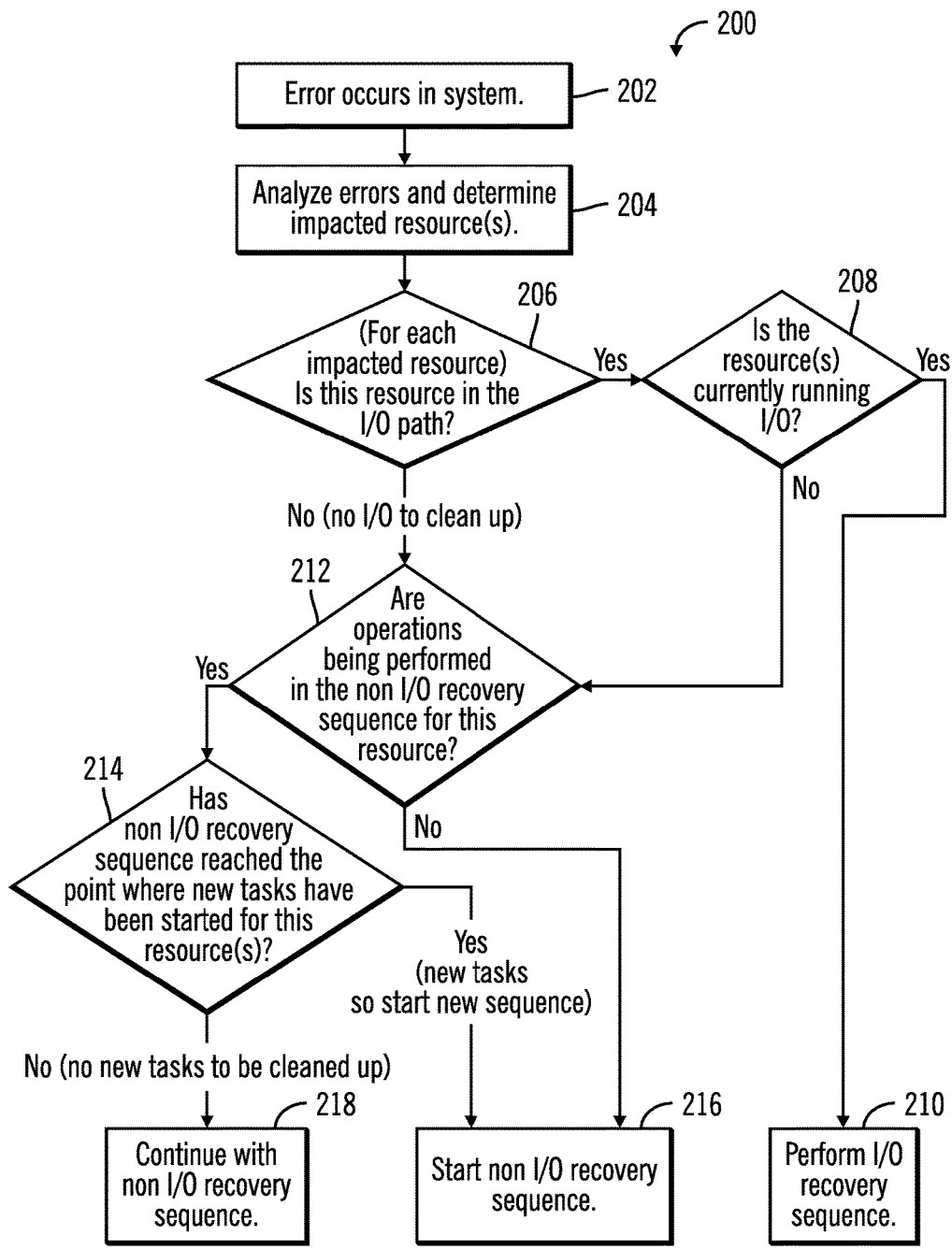
FIG. 2 illustrates a flowchart that shows operations to recover from errors in the storage controller based on determining whether impacted resources are in an I/O path or not, in accordance with certain embodiments.

FIG. 2 illustrates a flowchart 200 that shows operations to recover from errors in the storage controller 102 based on determining whether impacted resources are in an I/O path or not, in accordance with certain embodiments. The operations shown in FIG. 2 may be performed in the storage controller 102.

Control starts at block 202 in which an error occurs in the system and an error analysis code is notified. Error data is gathered to determine the characteristics of the error. Data is analyzed (at block 204) and resources impacted by error are determined.

Control proceeds to block 206 in which a determination is made for each impacted resource whether the resource is in an I/O path (e.g., in the path of a customer I/O operations from a host 106a . . . 106m to a storage device via the storage controller 102).

If at block 206 it is determined that the impacted resource is in an I/O path, control proceeds to block 208 in which a determination is made as to whether the resource is currently being used for performing an I/O operation. If so, control proceeds to block 210 in which a recovery from an I/O operation is performed. If not, control proceeds to block 212 in which a determination is made as to whether operations are being performed in the non I/O recovery sequence for the impacted resource.

If at block 212 it is determined that operations are being performed in the non I/O recovery sequence for the impacted resource, control proceeds to block 214 in which it is determined whether the non I/O recovery sequence has reached the point where new tasks have been started for the impacted resource. If so, then a non I/O recover sequence is started (at block 216). If not, then the process continues (at block 218) with the non I/O recovery sequence.

If at block 206 it is determined that the impacted resource is not in the I/O path control proceeds to block 212 to determine whether operations are being performed in the non I/O recovery sequence for the impacted resource.

If at block 212 it is determined that operations are not being performed in the non I/O recovery sequence for the impacted resource, control proceeds to block 216 in which the non I/O recovery sequence is started.

Therefore, FIG. 2 illustrates certain embodiments in which if resources that are impacted are not in the host I/O path (e.g., power supplies, power management card etc. are not in the host I/O path) then the error may be recovered without cleaning up customer I/O (no failed customer I/O has occurred). If the impacted resources are in the host I/O path, but are not currently running 10, then there is no need to clean up the host I/O.

Figure 3:
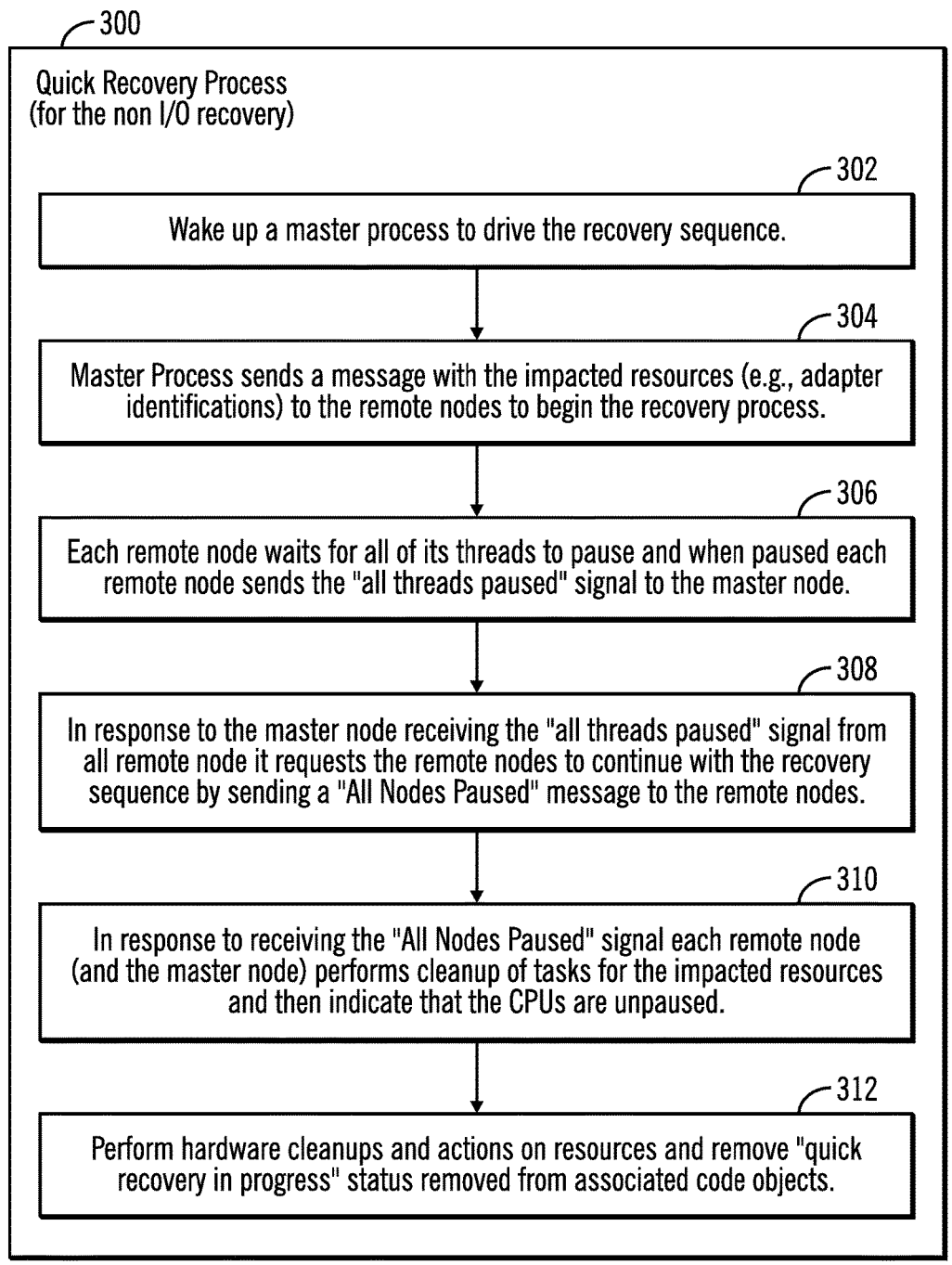
FIG. 3 illustrates a flowchart for a recovery process, in accordance with certain embodiments.

FIG. 3 illustrates a flowchart 300 for a recovery process, in accordance with certain embodiments. The operations shown in FIG. 3 may be performed in the storage controller complex 102 and may be referred to as a "quick recovery process".

Control starts at block 302 in which a master process 112 of the master node 104a wakes up in the storage controller to drive the recovery sequence. The master process 112 sends (at block 304) a message with the impacted resources (e.g., adapter identifications) to the remote nodes 104b . . . 104n to begin the recovery process. Each remote node 104b . . . 104n waits for all of its threads to pause (i.e., quiesce) and when paused each remote node 104b . . . 104n sends an "all threads paused" signal to the master node 104a (at block 306).

When the master node 104a receives the "all threads paused" signal from all of the remote nodes 104b . . . 104n (at block 308) the master node 104a requests the remote nodes 104b . . . 104n to continue with the recovery sequence by sending a "All Nodes Paused" message to the remote nodes 104b . . . 104n.

Control proceeds to block 310 in which in response to receiving the "All Nodes Paused" signal each remote node 104b . . . 104n (and the master node 104a) performs the cleanup of tasks for the impacted resources and then indicates that the Central Processing Units (CPUs) of the nodes are unpaused (i.e., the CPUs are no longer paused and can continue processing). Control proceeds to block 312 in which hardware cleanups and actions on resources are performed and the "quick recovery in progress" status is removed from associated code objects.

Figure 4:
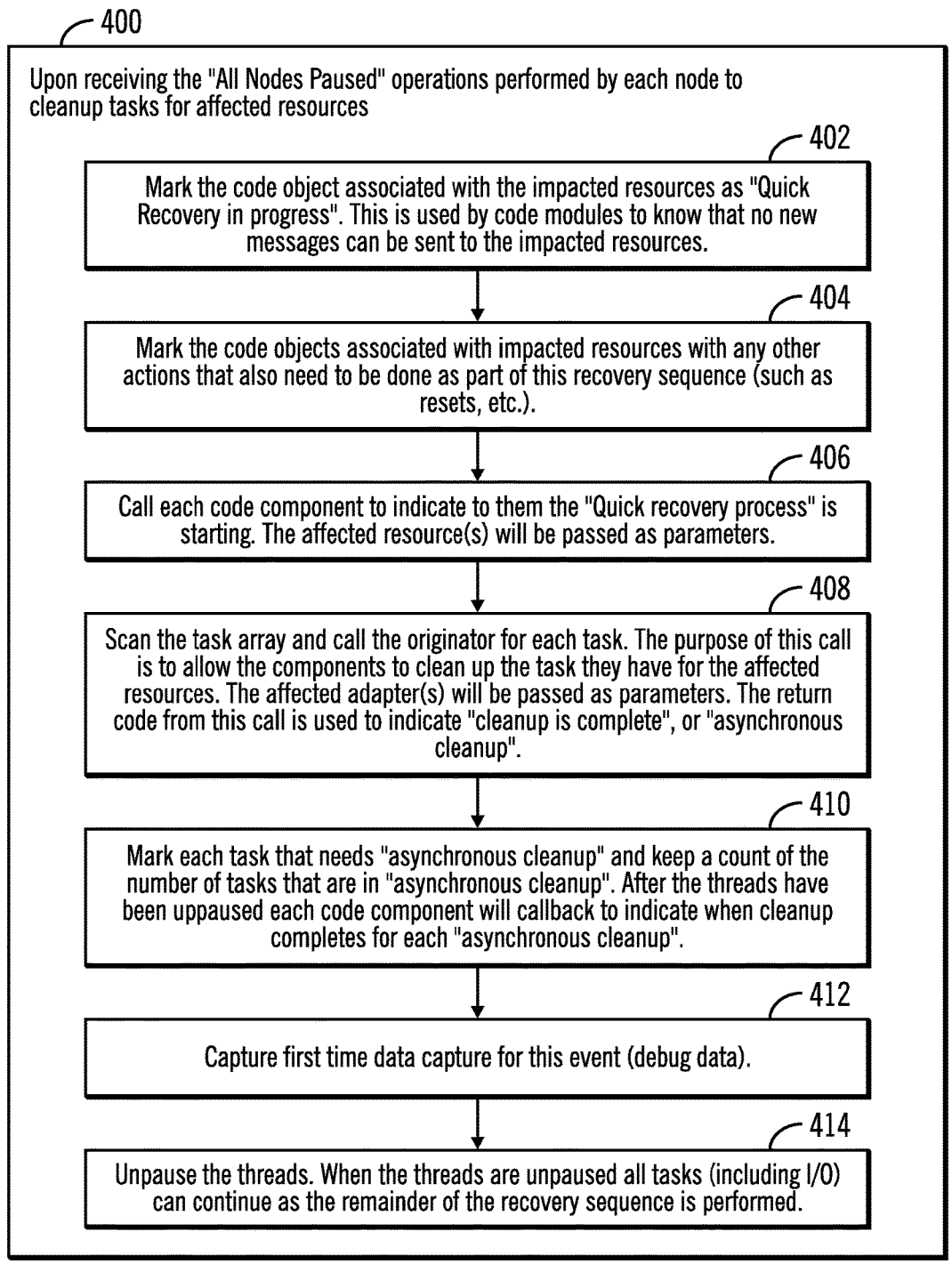
FIG. 4 illustrates a flowchart that shows operations performed by each node of a storage controller to clean up tasks for affected resources, in accordance with certain embodiments.

FIG. 4 illustrates a flowchart 400 that shows operations performed by each node of a storage controller 102 to clean up tasks for affected resources, in accordance with certain embodiments. The operations shown in FIG. 4 may be performed in the storage controller complex 102.

In certain embodiments, in response to receiving the "All Nodes Paused" signal (as shown in block 308 of FIG. 3) each remote node (and also the master node) performs the operations shown in FIG. 4. Control starts at block 402 in which the code object associated with the impacted resources are marked. In embodiments shown in FIG. 4 the affected resourced that are marked are non I/O resources but in alternative embodiments the resources may be any resource. The marking is used by code modules to determine that no new messages may be sent to the impacted resources.

Control proceeds to block 404 in which the code objects associated with impacted resources are marked with any other actions that also need to be done as part of this recovery sequence (such as resets, etc.). Each code component is called (at block 406) to indicate to them "quick recovery process" is starting. The affected resource(s) may be passed as parameters. The resources that are not impacted are not informed that "the quick recovery process" is starting and the non-impacted resources continue to perform operations that they were expected to perform.

The task array is scanned and the originator for each task is called (at block 408). Thus tasks are removed selectively and all tasks are not wiped out. Therefore, a distinction is made between resources that are impacted and resources that are not impacted and the process clean up tasks that need to cleaned up, i.e., only tasks that took up the error are cleaned up. In other words, the tasks associated with the resources that are impacted are cleaned up. Thus the purpose of the call in block 408 is to allow the components to clean up the task they have for the affected resources. In certain embodiments, the affected adapter(s) are passed as parameters. The return code from this call is used to indicate "cleanup is complete", or an "asynchronous cleanup".

Control proceeds to block 410 in which each task that needs "asynchronous cleanup" (clean up in background while I/O is restarted) is marked and keep a count of the number of tasks that are in "asynchronous cleanup". After the threads have been unpaused each code component may callback to indicate when cleanup completes for each "asynchronous cleanup". First time data capture is performed for this event to capture debug data (at block 412) and the threads are unpaused (at block 414). When the threads are unpaused all tasks (including I/O) can continue as the remainder of the recovery sequence is performed.

Figure 5:
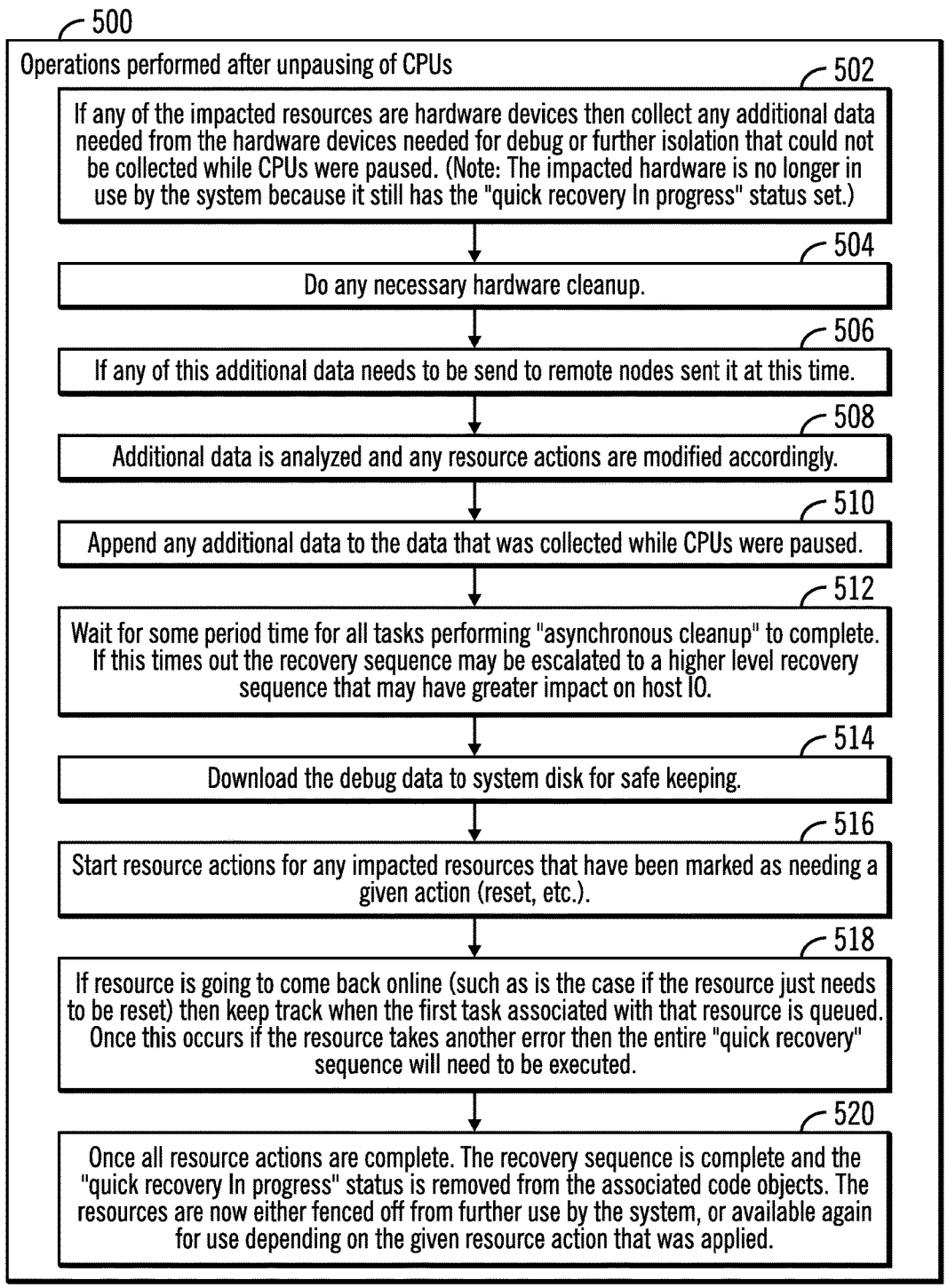
FIG. 5 illustrates a flowchart that shows operations performed in a storage controller after unpausing of central processing units (CPUs), in accordance with certain embodiments.

FIG. 5 illustrates a flowchart that shows operations performed in a storage controller 102 after unpausing of central processing units (CPUs), in accordance with certain embodiments. The operations shown in FIG. 5 may be performed in the storage controller 102 after the CPUs of the remote nodes are unpaused (as shown in block 310 of FIG. 3).

Control starts at block 502 in which if any of the impacted resources are hardware devices then a collection is made of any additional data needed from the hardware device that is needed for debug or for further isolation that could not be performed while the CPUs were paused. The impacted hardware is no longer in use by the system because it still has the "quick recovery in progress" status set.

Control proceeds to 504 in which any necessary hardware cleanup is performed, and if any of this additional data needs to be sent to remote nodes then the additional data is sent (at block 506). The additional data is analyzed and any actions on the resources are modified accordingly (at block 508).

Control proceeds to block 510, in which any additional data is appended to the data that was collected while CPUs were paused. The process waits (at block 512) for some period of time for all tasks performing "asynchronous cleanup" to complete. If this times out, then the recovery sequence may be escalated to a higher level recovery sequence that may have a greater impact on host I/O.

Control proceeds to block 514 in which the debug data is downloaded to system disk for safe keeping. Resource actions are started (at block 516) for any impacted resources that have been marked as needing a given action (e.g., reset, etc.). If a resource is going to come back online (such as is the case where the resource just needs to be reset), then the process keeps (at block 518) track of when the first task associated with that resource is queued. Once this occurs if the resource causes another error then the entire "quick recovery" sequence needs to be performed once again.

Control proceeds to block 520, where once all resource actions are complete, the recovery sequence is complete and the "quick recovery in progress" status is removed from the associated code objects. The resources are now either fenced off from further use by the system, or available again for use depending on the given resource action that was applied.

Figure 6:
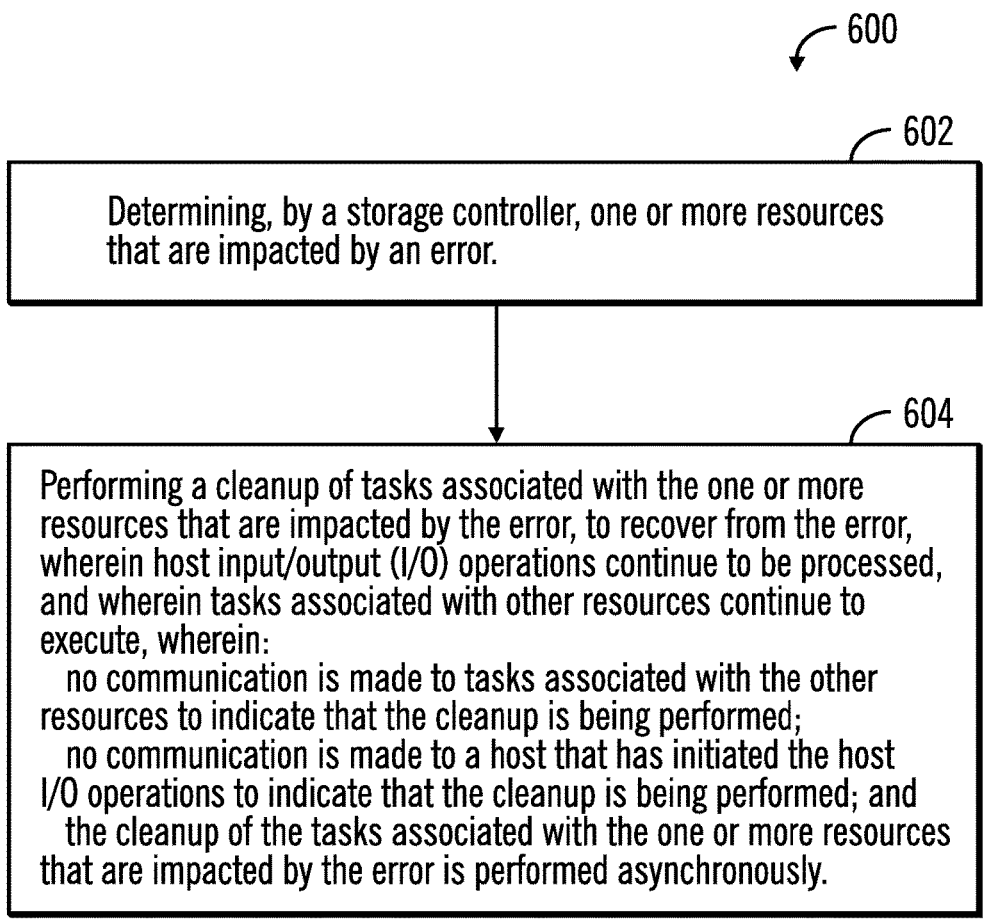
FIG. 6 illustrates a flowchart that shows operations performed by the storage controller, in accordance with certain embodiments.

FIG. 6 illustrates a flowchart that shows operations performed by the storage controller.

Control starts at lock 602 in which a storage controller 102 determines one or more resources that are impacted by an error. A cleanup of tasks associated with the one or more resources that are impacted by the error is performed (at block 604), to recover from the error, wherein host input/output (I/O) operations continue to be processed, and wherein tasks associated with other resources continue to execute. No communication is made to tasks associated with the other resources to indicate that the cleanup is being performed, and no communication is made to a host that has initiated the host I/O operations to indicate that the cleanup is being performed. The cleanup of the tasks associated with the one or more resources that are impacted by the error is performed asynchronously.

Therefore, FIGS. 1-6 illustrate certain embodiments for recovering resources within the storage system with little or no impact to host operations. Resources are recovered across multiple storage nodes. Processes perform analyzing the errors and determining the impacted resources and performing the recovery process only on the resources impacted so that resources that are not impacted are not affected by the recovery process. In one embodiment, this includes determining if the impacted resource is in the I/O path, determining if the impacted resource is currently running an I/O, determining if the non I/O recovery sequence is currently being run, and determining if the sequence has reached the point where new tasks have been started for this resource.

Certain embodiment are directed towards placing as little impact on the host as possible during the recovery process. Certain embodiments determine which tasks within the system need to be cleaned up because a given resource(s) was impacted by an error, without impacting other tasks not associated with the impacted resource. For instance if a non I/O resource has been impacted then there is no need to cleanup any I/O related tasks. Also, tasks may be cleaned up asynchronously.

Certain embodiments keep track of when new tasks have been started for the impacted resources to determine when the error recovery sequence would need to be restarted if another error occurs on the impacted resource(s). If another error occurs on the impacted resource but no new tasks have occurred then there is no need to go through another recovery sequence (i.e. just continue with current sequence). As part of the cleanup, elements such as Task Control Blocks (TCBs) that were associated with the impacted resource may then be used for other resources. When tasks are unpaused the impacted resource(s) have been marked as being in recovery, so the rest of the system is aware that this resource cannot be used at this time.

In certain embodiments, tasks that need to take longer than 100 ms to clean up are indicated as "Asynchronous cleanup is needed", and are cleaned up after tasks have been unpaused (i.e., allowed to continue after being paused). Debug data that cannot be collected while tasks are paused, is collected after tasks are unpaused and appended to the previously collected data.

In certain embodiments a determination is made as which resource has an error, and the process performs a cleanup of the tasks associated with that resource without affecting host I/O and other resource tasks. The resources not affected and host I/O have no knowledge that the system is going through error recovery since the system is only paused for a short time (e.g., 80 ms) to perform the recovery. The process also allows the recovery of the affected resource to be done while the system is paused (i.e., synchronously) and while the system is running (i.e., asynchronously).

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
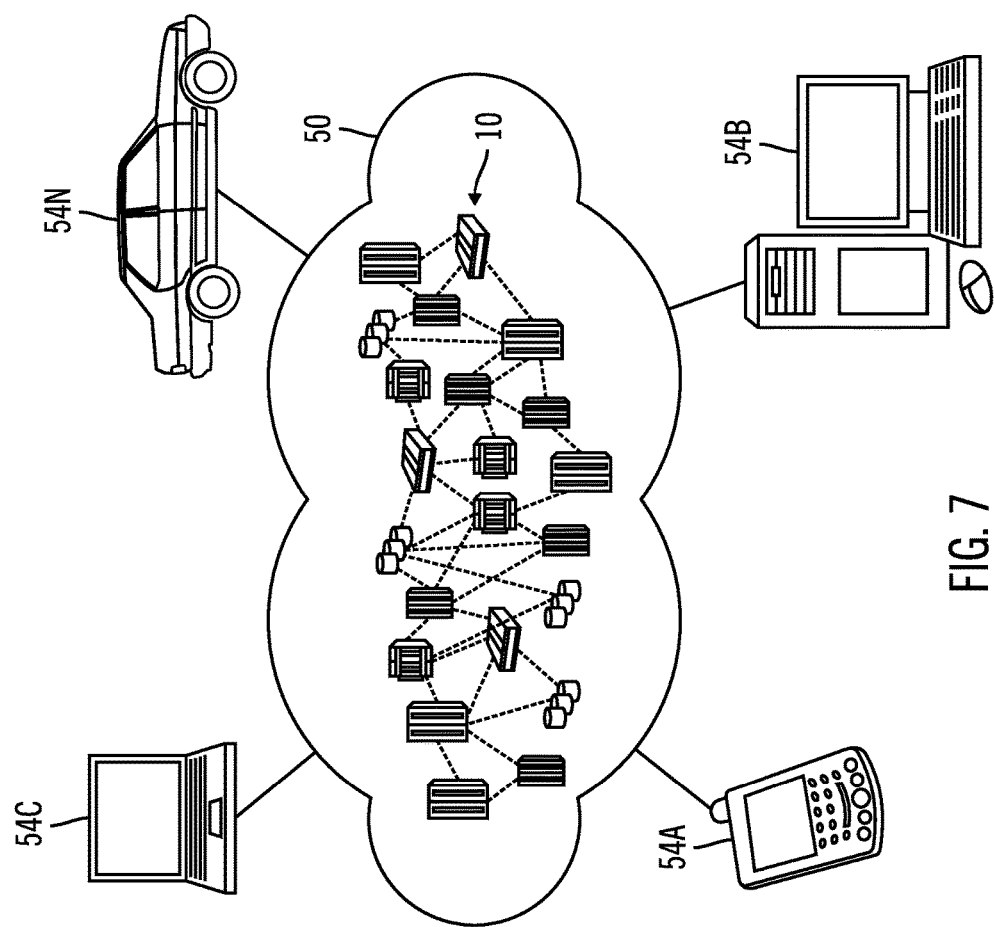
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
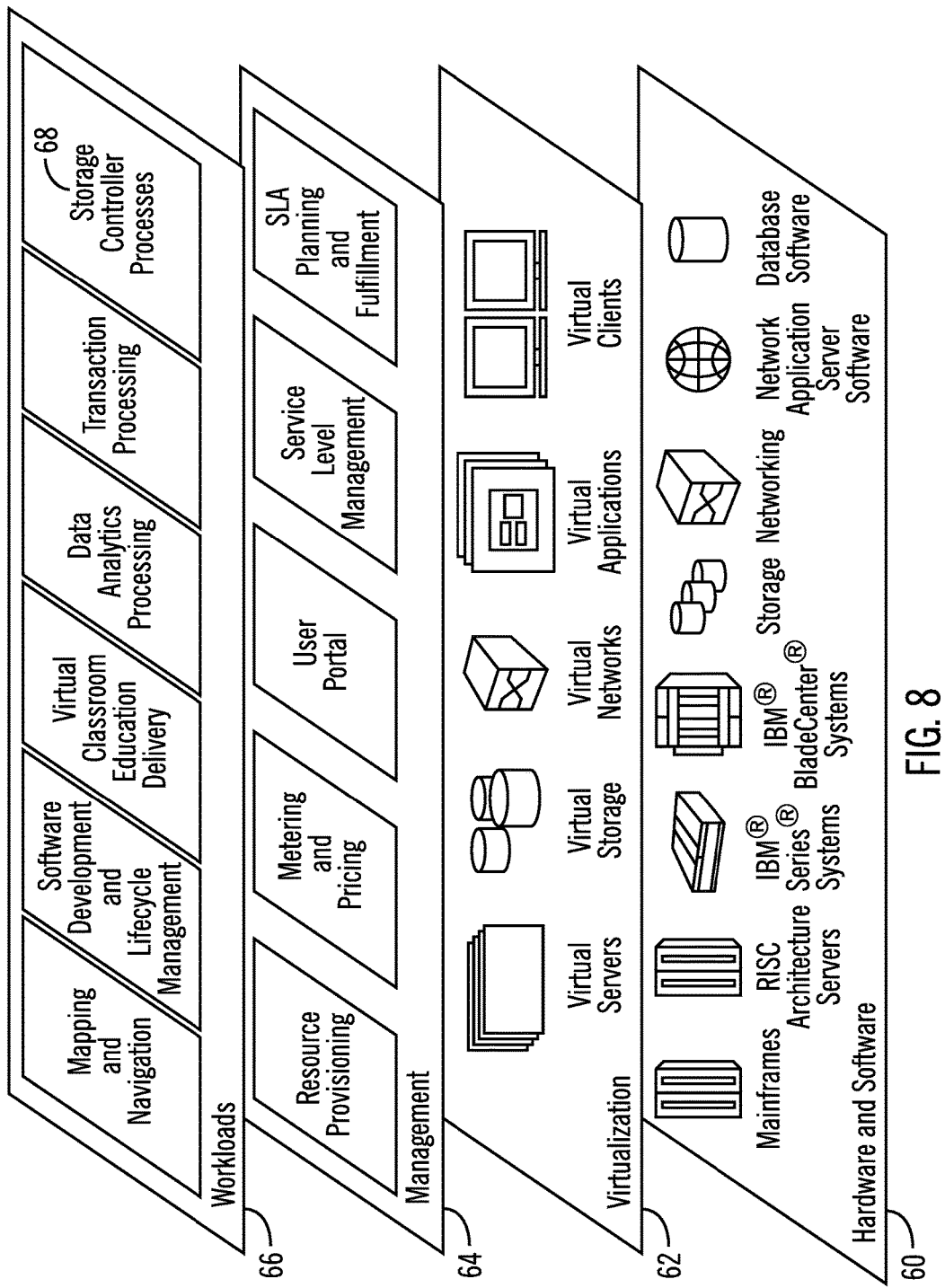
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized.

Examples of workloads and functions which may be provided from this layer include: mapping and navigation; software development and lifecycle management; virtual classroom education delivery; data analytics processing; transaction processing; and the storage controller processes 68 (corresponding to the master process 112 and other processes in the storage controller 102) as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
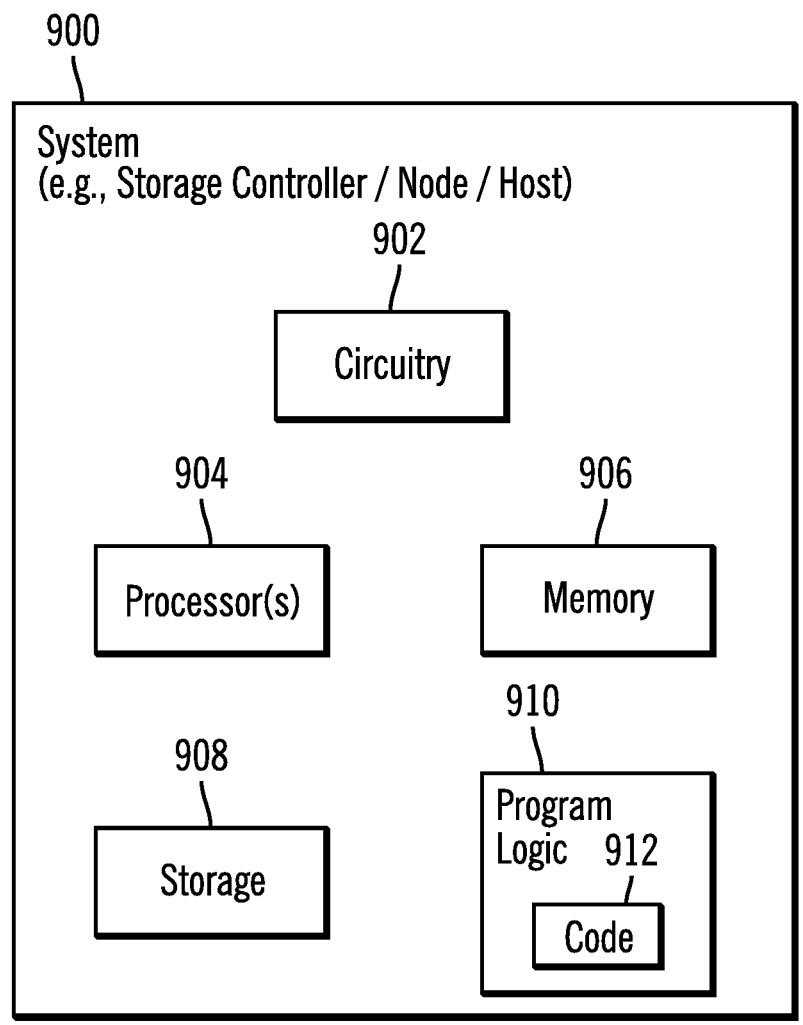
FIG. 9 illustrates a block diagram of a computational system that shows certain elements that may be included in the storage controller including nodes shown in FIG. 1, in accordance with certain embodiments.

FIG. 9 illustrates a block diagram that shows certain elements that may be included in the storage controller 102, the hosts 106a ... 106m, or the nodes 104a ... 104n, in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* IBM, zSeries, pSeries, xSeries, BladeCenter, WebSphere, and DB2 are trademarks of International Business Machines Corporation registered in many jurisdictions worldwide.

What is claimed is:

1. A method, comprising:
in response to determining that a resource is impacted by an error in an I/O path, determining whether the impacted resource is currently executing I/O;
in response to determining that the impacted resource is currently executing I/O, performing an I/O recovery sequence; and
in response to determining that the impacted resource is currently not executing I/O, determining whether operations are being performed in a non I/O recovery sequence for the impacted resource.

2. The method of claim 1, the method further comprising:
performing a cleanup of tasks associated with the resource that is impacted by the error, to recover from the error.

3. The method of claim 2, wherein:
no communication is made to tasks associated with other resources to indicate that the cleanup is being performed; and
no communication is made to a host that has initiated host I/O operations to indicate that the cleanup is being performed.

4. The method of claim 2, wherein:
the cleanup of the tasks associated with the resource that is impacted by the error is performed asynchronously.

5. A system, comprising:
a memory; and
a processor coupled to the memory, wherein the processor performs operations, the operations comprising:
  in response to determining that a resource is impacted by an error in an I/O path, determining whether the impacted resource is currently executing I/O;
  in response to determining that the impacted resource is currently executing I/O, performing an I/O recovery sequence; and
  in response to determining that the impacted resource is currently not executing I/O, determining whether operations are being performed in a non I/O recovery sequence for the impacted resource.

6. The system of claim 5, the operations further comprising:
performing a cleanup of tasks associated with the resource that is impacted by the error, to recover from the error.

7. The system of claim 6, wherein:
no communication is made to tasks associated with other resources to indicate that the cleanup is being performed; and
no communication is made to a host that has initiated host I/O operations to indicate that the cleanup is being performed.

8. The system of claim 6, wherein:
the cleanup of the tasks associated with the resource that is impacted by the error is performed asynchronously.

9. A computer program product, the computer program product comprising:
a computer readable storage medium having computer readable program code embodied therewith, the computer readable program code configured to perform operations on a storage controller, the operations comprising:
  in response to determining that a resource is impacted by an error in an I/O path, determining whether the impacted resource is currently executing I/O;
  in response to determining that the impacted resource is currently executing I/O, performing an I/O recovery sequence; and
  in response to determining that the impacted resource is currently not executing I/O, determining whether operations are being performed in a non I/O recovery sequence for the impacted resource.

10. The computer program product of claim 9, the operations further comprising:
performing a cleanup of tasks associated with the resource that is impacted by the error, to recover from the error.

11. The computer program product of claim 10, wherein:
no communication is made to tasks associated with other resources to indicate that the cleanup is being performed; and
no communication is made to a host that has initiated host I/O operations to indicate that the cleanup is being performed.

12. The computer program product of claim 10, wherein:
the cleanup of the tasks associated with the resource that is impacted by the error is performed asynchronously.

* * * * *